(12) United States Patent
Nakagawa

(10) Patent No.: US 8,873,099 B2
(45) Date of Patent: Oct. 28, 2014

(54) FACSIMILE APPARATUS, COMMUNICATION APPARATUS, COMMUNICATION METHOD AND STORAGE MEDIUM

(71) Applicant: Canon Kabushiki Kaisha, Tokyo (JP)

(72) Inventor: Kaori Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/124,610

(22) PCT Filed: Oct. 10, 2013

(86) PCT No.: PCT/JP2013/078246
§ 371 (c)(1),
(2), (4) Date: Dec. 6, 2013

(87) PCT Pub. No.: WO2014/073351
PCT Pub. Date: May 15, 2014

(65) Prior Publication Data
US 2014/0168703 A1    Jun. 19, 2014

(30) Foreign Application Priority Data

Nov. 7, 2012  (JP) ................................. 2012-245634

(51) Int. Cl.
| | |
|---|---|
| G06F 3/12 | (2006.01) |
| H04N 1/00 | (2006.01) |
| H04N 1/32 | (2006.01) |
| H04N 1/327 | (2006.01) |

(52) U.S. Cl.
CPC ......... H04N 1/0022 (2013.01); H04N 1/32667 (2013.01); H04N 1/32786 (2013.01); H04N 1/32673 (2013.01); H04N 1/32765 (2013.01); H04N 1/32641 (2013.01)

USPC .......... 358/1.15; 358/434; 358/436; 358/438; 358/504; 358/508

(58) Field of Classification Search
CPC ...................................................... H04M 11/00
See application file for complete search history.

(56) References Cited

U.S. PATENT DOCUMENTS

| | | | |
|---|---|---|---|
| 5,544,234 A | 8/1996 | Terajima et al. | 379/100 |
| 5,563,932 A | 10/1996 | Tachibana et al. | 379/100 |

(Continued)

FOREIGN PATENT DOCUMENTS

| | | |
|---|---|---|
| AU | 2003271155 | 10/2003 |
| JP | 2004-187262 | 7/2004 |

(Continued)

OTHER PUBLICATIONS

PCT International Search Report and Written Opinion of the International Searching Authority, mailed Dec. 17, 2013, in PCT/JP2013/078246.

*Primary Examiner* — Thomas Lett
(74) *Attorney, Agent, or Firm* — Fitzpatrick, Cella, Harper, Scinto

(57) ABSTRACT

Provided are a facsimile apparatus, a communication apparatus, and a communication method that perform communication using a session established according to a session initiation protocol (SIP). If an INVITE in which a media type is designated as "audio" is received, an INVITE in which a media type is designated as "image" is transmitted. If a success response is made to the transmitted INVITE, an image session is established and facsimile communication or image communication is executed. If an error response is made to the transmitted INVITE, calling processing for calling an operator is started.

19 Claims, 7 Drawing Sheets

(56) References Cited

U.S. PATENT DOCUMENTS

| | | | |
|---|---|---|---|
| 5,974,123 A | 10/1999 | Nakayama et al. | 379/100.16 |
| 7,933,047 B2 | 4/2011 | Nakagawa | 358/400 |
| 8,037,138 B2 | 10/2011 | Izumi | 709/206 |
| 8,130,395 B2 | 3/2012 | Shimizu et al. | 358/1.15 |
| 8,179,553 B2 | 5/2012 | Nakagawa | 358/1.15 |
| 2003/0108020 A1* | 6/2003 | Garcia-Martin | 370/338 |
| 2004/0162094 A1* | 8/2004 | Riikonen et al. | 455/502 |
| 2006/0136596 A1 | 6/2006 | Izumi | 709/230 |
| 2006/0155864 A1 | 7/2006 | Izumi | 709/230 |
| 2007/0280219 A1 | 12/2007 | Shimizu et al. | 370/356 |
| 2010/0278172 A1* | 11/2010 | Watanabe et al. | 370/352 |
| 2011/0129078 A1 | 6/2011 | Takeyama et al. | 379/201.02 |
| 2013/0050755 A1 | 2/2013 | Nakagawa | 358/1.15 |
| 2013/0051541 A1 | 2/2013 | Inoue | 379/100.01 |

FOREIGN PATENT DOCUMENTS

| | | |
|---|---|---|
| JP | 2007-324857 | 12/2007 |
| JP | 2011-114672 | 6/2011 |
| JP | 2013-046226 | 3/2013 |
| JP | 2013-046228 | 3/2013 |
| WO | 2004/034657 | 4/2004 |
| WO | 2004/111749 | 12/2004 |

* cited by examiner

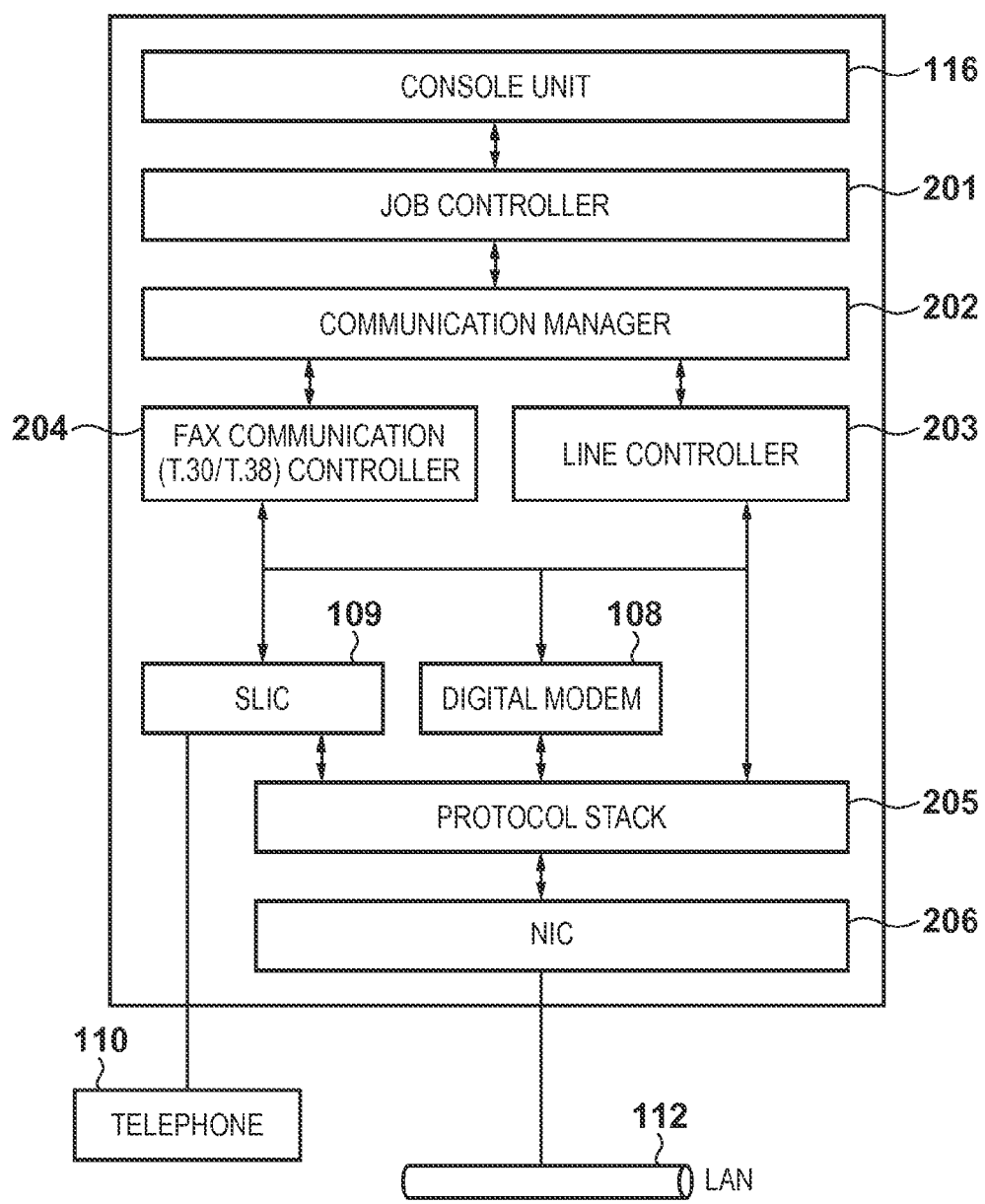
F I G. 2

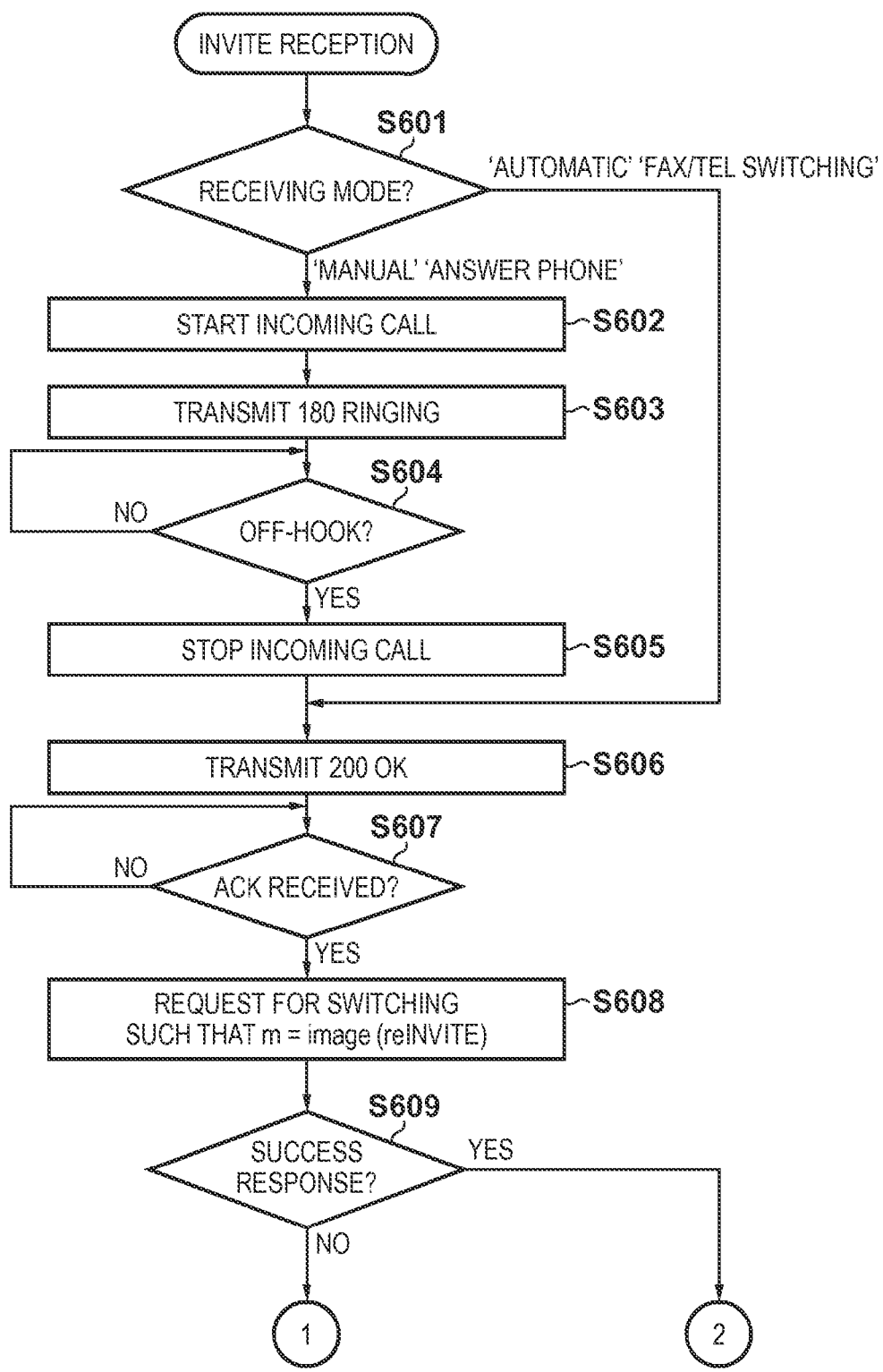
F I G. 6A

FACSIMILE APPARATUS, COMMUNICATION APPARATUS, COMMUNICATION METHOD AND STORAGE MEDIUM

TECHNICAL FIELD

The present invention relates to a facsimile apparatus, a communication apparatus, a communication method, and a storage medium.

BACKGROUND ART

In recent years, due to widespread use of the Internet and IP phones, a method for performing facsimile communication using an IP network as a communication pathway is being established. A call control protocol, such as Session Initiation Protocol (SIP), for generating, changing, and disconnecting a session for real-time communication is being standardized. Also, audio communication on a VoIP network that performs communication by assuming a modem signal tone as a voice with the use of a VoIP (Voice over Internet Protocol) has started to spread. Also, T.38 protocol for converting a G3 facsimile (ITU-T recommendation T.30) signal into an IP message on an IP network and transmitting the IP message in real time is recommended, and an internet facsimile apparatus that conforms to ITU-T recommendation T.38 is also on the market. Facsimile communication using this T.38 protocol has a bandwidth that is able to be smaller than that of the audio communication on VoIP network, which needs a voice band, and does not need to modulate data into a modem signal, resulting in an advantage of allowing high-speed communication.

Also, an IP-PBX (Internet Protocol Private Branch eXchange) is spreading as an apparatus for performing circuit switching of IP phone terminals in a private IP network. This IP-PBX is an apparatus for realizing an extension telephone network using IP phones on in-House LAN, and uses the call control protocol such as SIP and H.323 to perform call control of the IP phones and the like. A real-time internet facsimile apparatus uses the SIP to obtain an IP address of a communication partner via this IP-PBX, and performs P2P communication with the communication partner. Generally, in the case of performing T.38 communication, a user designates the media type of SIP as "application" or "image" so as to perform communication, and designates the media type of SIP as "audio" so as to perform telephone talk.

IP-PBXs that can perform T.38 communication include an apparatus that needs to start operating with the media type designated as "audio" at the time of establishment of a session using SIP, even in the case of performing T.38 communication, and then performs facsimile communication by the media type being switched to "image".

Also, a Subscriber Line Interface Circuit (SLIC) module is provided as a technology for establishing an IP phone. This module performs A/D conversion processing and telephone line emulation using an audio codec such as G.711. With the SLIC, it is possible to connect an analog telephone to an IP network without the use of a telephone line, thus providing a function that emulates a telephone line, such as generation of a call signal and various types of tone signals of a telephone line (telephone exchange).

FIG. 3 is a diagram illustrating a conventional incoming call sequence.

In the case where an IP phone using a SLIC receives a session establishment request (INVITE signal) for establishing a session of the "audio" media type from a sender side, the IP phone generates a call signal for an analog telephone connected to the SLIC to make a sound, and the generated call signal causes the ringer of the analog telephone to make a sound. Then, when an operator responds to the analog telephone, the SLIC detects that the analog telephone is in an off-hook state, stops the call signal, and transmits a success response (200 OK) to the sender side, and the sender returns ACK. Accordingly, an audio session is established, and the operator is placed in a talk state.

Japanese Patent Laid-Open No. 2011-114672 gives a conventional example for controlling incoming calls of an IP phone. According to this document, in a telephone network, an incoming call is first received by an interactive voice response, and a ringer tone is not rung immediately after the reception of the incoming call. In the interactive voice response, for each connection, a sender is notified of an authentication tone obtained by superimposing random numbers subjected to random number processing each time and background tones one on top of the other, as an authentication tone needed for the connection, and an incoming call is rung only for an incoming call in which a correct response value is received, and otherwise, no incoming call is rung.

In the following case, it is assumed that not only when telephone talk is performed but also when T.38 communication is performed, an IP-PBX that needs to start operating with a media type designated as "audio" in the case of a session establishment request (INVITE signal) using SIP is used. The communication terminal on a receiver side cannot determine, based on the session establishment request (INVITE signal), whether the incoming call is for telephone talk or T.38 communication. Therefore, a failure may occur such that an incoming call for calling an operator is made even in the case of an incoming call for T.38 communication, and thus a no-ring status for incoming calls becomes impossible in a facsimile apparatus.

Also, there is a real-time internet facsimile apparatus that supports, in addition to the T.38 communication function, an IP telephone function, and a function for performing audio communication on a VoIP network. Such a facsimile apparatus needs an incoming call control processing for selecting the most appropriate communication method from the received session establishment request, in order to support, also on the IP network, functions of a conventional G3 facsimile apparatus including a telephone function, which has, in addition to the telephone function, a plurality of receiving modes.

SUMMARY OF INVENTION

An aspect of the present invention is to eliminate the above-mentioned problems with the conventional technology.

A feature of the present invention is to provide a technique for enabling incoming calls to not make a ring, to appropriately be performed, even if it cannot be determined whether telephone talk or facsimile communication is to be performed when a session establishment request is received.

According to one aspect of the present invention, there is provided a facsimile apparatus for performing communication using a session established according to a session initiation protocol (SIP), comprising: transmission means for transmitting, in a case that an INVITE in which a media type is designated as "audio" is received, an INVITE in which a media type is designated as "image"; facsimile communication means for establishing an image session and executing facsimile communication in a case that a success response is made to the INVITE transmitted by the transmission means; and calling means for starting calling processing for calling an operator in a case that an error response is made to the INVITE transmitted by the transmission means.

According to another aspect of the present invention, there is provided a communication apparatus for performing communication using a session established according to a session initiation protocol (SIP), comprising: transmission means for transmitting, in a case that an INVITE in which "audio" is designated is received, an INVITE in which "image" is designated; image communication means for executing image communication in a case that a success response is made to the INVITE transmitted by the transmission means; and calling means for starting calling processing for calling an operator in a case that an error response is made to the INVITE transmitted by the transmission means.

According to still another aspect of the present invention, there is provided a communication apparatus for performing communication using a session established according to a session initiation protocol (SIP), comprising: transmission means for transmitting, in a case that an INVITE is received, an INVITE for changing a media type; and calling means for starting calling processing for calling an operator in a case that an error response is made to the INVITE transmitted by the transmission means.

According to yet another aspect of the present invention, there is provided a method for controlling a facsimile apparatus for performing communication using a session established according to a session initiation protocol (SIP), comprising: a transmission step of transmitting, in a case that an INVITE in which a media type is designated as "audio" is received, an INVITE in which a media type is designated as "image"; a facsimile communication step of establishing an image session and executing facsimile communication in a case that a success response is made to the INVITE transmitted in the transmission step, and a calling step of starting calling processing for calling an operator in a case that an error response is made to the INVITE transmitted in the transmission step.

According to still yet another aspect of the present invention, there is provided a communication method for performing communication using a session established according to a session initiation protocol (SIP), comprising: a transmission step of transmitting, in a case that an INVITE in which "audio" is designated is received, an INVITE in which "image" is designated; an image communication step of executing image communication in a case that a success response is made to the INVITE transmitted in the transmission step; and a calling step of starting calling processing for calling an operator in a case that an error response is made to the INVITE transmitted in the transmission step.

According to yet still yet another aspect of the present invention, there is provided a communication method for performing communication using a session established according to a session initiation protocol (SIP), comprising: a transmission step of transmitting, in a case that an INVITE is received, an INVITE for changing a media type; and a calling step of starting calling processing for calling an operator in a case that an error response is made to the INVITE transmitted in the transmission step.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a block diagram illustrating a software configuration of the facsimile apparatus according to the embodiment of the present invention.

FIG. 5 is a flowchart for describing processing that is performed by the facsimile apparatus according to the present embodiment when a signal comes in.

FIGS. 6A and 6B are flowcharts for describing processing that is performed when the facsimile apparatus according to the embodiment of the present invention receives a session establishment request (INVITE signal).

DESCRIPTION OF EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
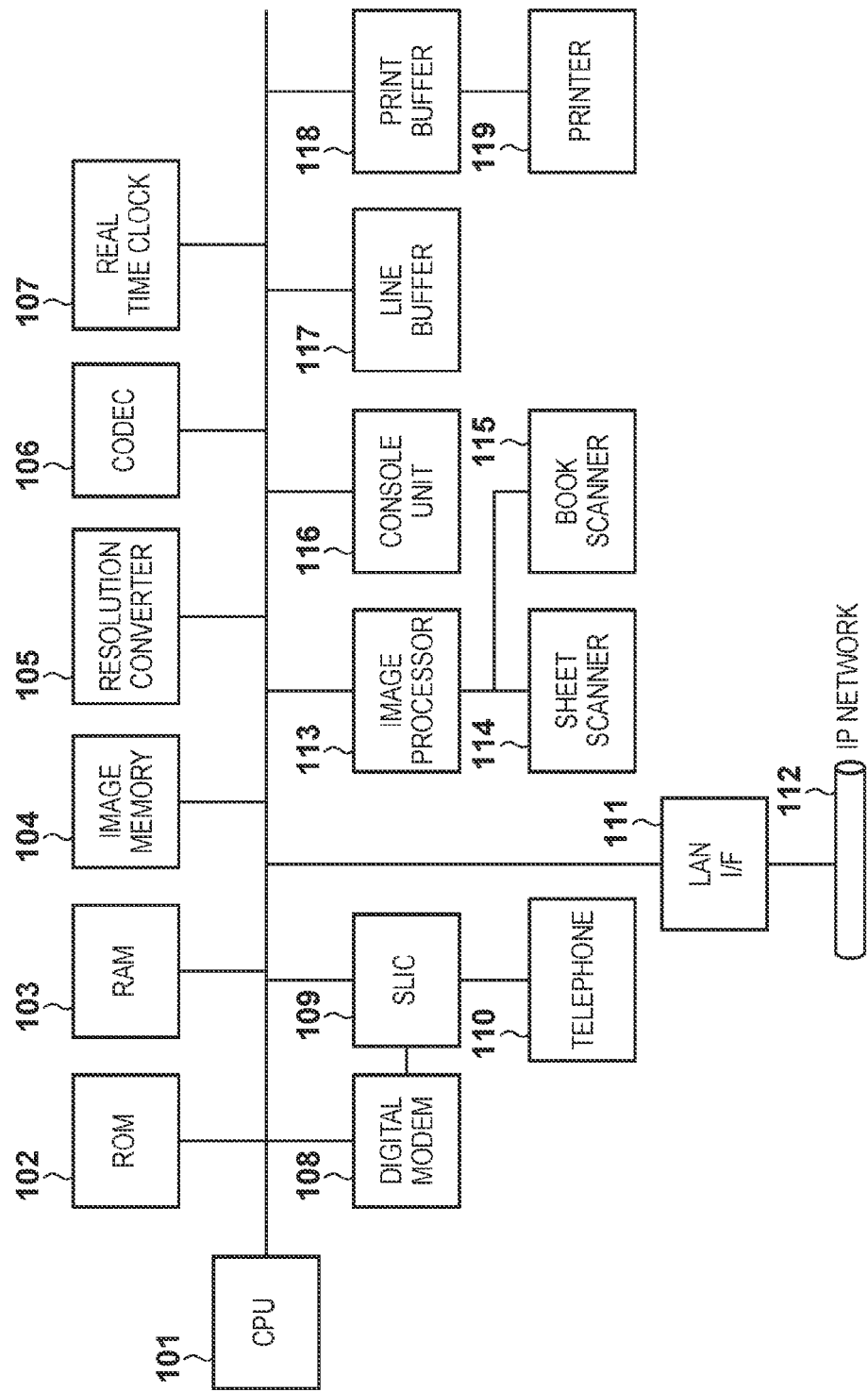
FIG. 1 is a block diagram illustrating a configuration of a facsimile apparatus according to an embodiment of the present invention.
Figure 3:
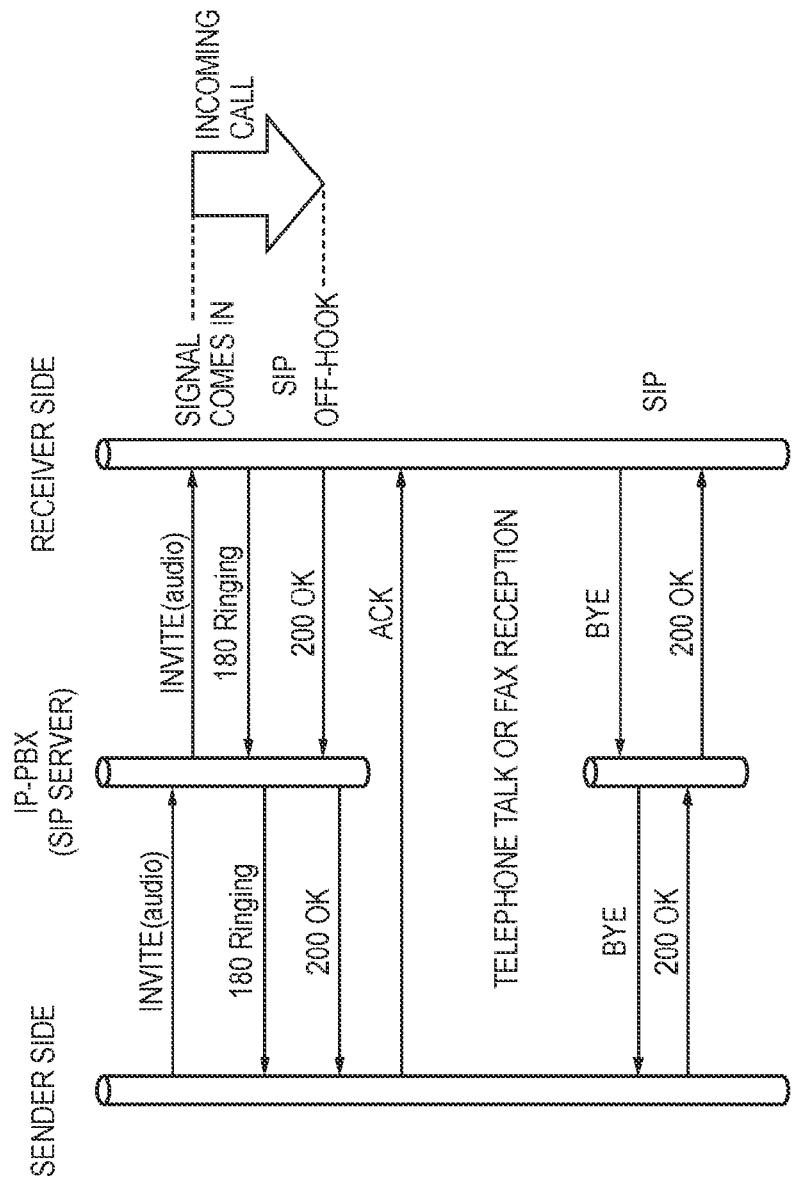
FIG. 3 is a sequence diagram illustrating a SIP protocol and a timing of incoming call processing when a signal comes in an IP phone, according to a conventional technology.

FIG. 1 is a block diagram illustrating a configuration of a facsimile apparatus according to an embodiment of the present invention. This facsimile apparatus is a real-time internet facsimile apparatus that uses a SIP protocol for establishing call connection on an IP network, has an IP telephone function, and is capable of performing G3 facsimile communication on a VoIP network or facsimile communication that conforms to ITU-T recommendation T.38.

In FIG. 1, a CPU 101 performs overall control of this apparatus in accordance with a program stored in a ROM 102. The ROM 102 has stored therein control programs for controlling the CPU 101, various types of data, and the like. A RAM 103 includes a SRAM and the like, and provides a work area in which various types of data are temporarily stored under operation of the CPU 101. An image memory 104 includes a DRAM and the like, and is used for storing image data. A resolution converter 105 changes the resolution of image data. Here, the resolution converter 105 performs control so as to convert raster data using millimeters into raster data using inches, for example. A codec 106 performs processing for coding and decoding image data processed or to be processed in this facsimile apparatus. A real time clock (RTC) 107 measures a predetermined time period, the current date and time, and the like in accordance with an instruction of the CPU 101.

A digital modem 108 modulates and codes a procedure signal and image data from this facsimile apparatus, and transmits the digital data to an IP telephone line. A SLIC 109 performs A/D conversion processing and telephone line emulation using an audio codec such as G.711. With this SLIC 109, it is possible to connect a telephone 110 to an IP network without the use of a telephone line, thus providing a function that emulates a telephone line, such as generation of a call signal and various types of tone signals of a phone line (telephone exchange). The telephone 110 includes a handset for use while talking on the telephone, and has an answer phone function. A LAN I/F 111 controls communication with a network 112 such as a LAN. This network 112 is an IP network such as a private IP or NGN.

An image processor 113 performs correction processing on image data read out by a scanner, and outputs high-definition image data. A sheet scanner 114 and a book scanner 115 are each provided with a CS image sensor, a document transport mechanism, and the like, and are each configured to optically read out a document, electronically generate image data, and output the generated image data. The sheet scanner 114 and the book scanner 115 can also read out both sides of the document. A console unit 116 is provided with a keyboard, a display unit, and the like, and is configured to display a message or the like to an operator and receive various types of input operations made by the operator. When the handset of the telephone 110 is taken off the hook, the console unit 116 displays a message indicating that real time dial operation is possible, and when the telephone 110 is taken off the hook, the console unit 116 displays that communication is being currently performed and a communication reservation is acceptable.

A line buffer 117 is used when image data transfer is controlled, and stores image data in units of lines. A print buffer 118 is a buffer memory for one page that stores print data to be output to a printer 119. The printer 119 is, for example, a laser beam printer, an inkjet printer, or the like that prints a received image or file data on normal paper. The printer 119 can also perform both-sided printing.

FIG. 2 is a block diagram illustrating a software configuration of the facsimile apparatus according to the embodiment of the present invention.

In the case of audio communication on a VoIP network, a user uses the console unit 116 to select the audio communication on a VoIP network type for facsimile communication. In this case, a call/talk job of an IP phone is generated by a job controller 201, and a line controller 203 is notified of the generated call/talk job via a communication manager 202. The line controller 203 instructs a protocol stack 205 to connect to the communication partner with the use of a SIP protocol since the call was originated by the IP phone. A SIP message generated by the protocol stack 205 is transmitted to a LAN (IP network) 112 via a NIC 206. When an audio session with the communication partner using the SIP protocol is generated, a voice input from the telephone 110 is coded by the SLIC 109, and voice is transmitted to the IP network 112 with the use of an RTP protocol of the protocol stack 205. When transmission is instructed to start by the console unit 116, a FAX communication controller 204 starts facsimile communication, and a generated facsimile procedure signal and image data are transmitted to the communication partner via the digital modem 108 by the RTP protocol in the protocol stack 205.

Also, in the case of facsimile transmission using the T.38 protocol (T.38 transmission), a function for selecting an IP network, a SIP protocol, or the like of the console unit 116 is applied to select T.38 transmission. A T.38 transmission job is generated by the job controller 201, and notification is sent to the communication manager 202. The communication manager 202 instructs, via the line controller 203, the protocol stack 205 to connect to the communication partner with the use of the SIP protocol. A SIP message generated by the protocol stack 205 is transmitted to the LAN (IP network) 112 via the NIC 206. Accordingly, when a session with the communication partner is generated using the SIP protocol, the communication manager 202 executes facsimile procedures with respect to the connected communication partner using the T.38 protocol.

Figure 4:
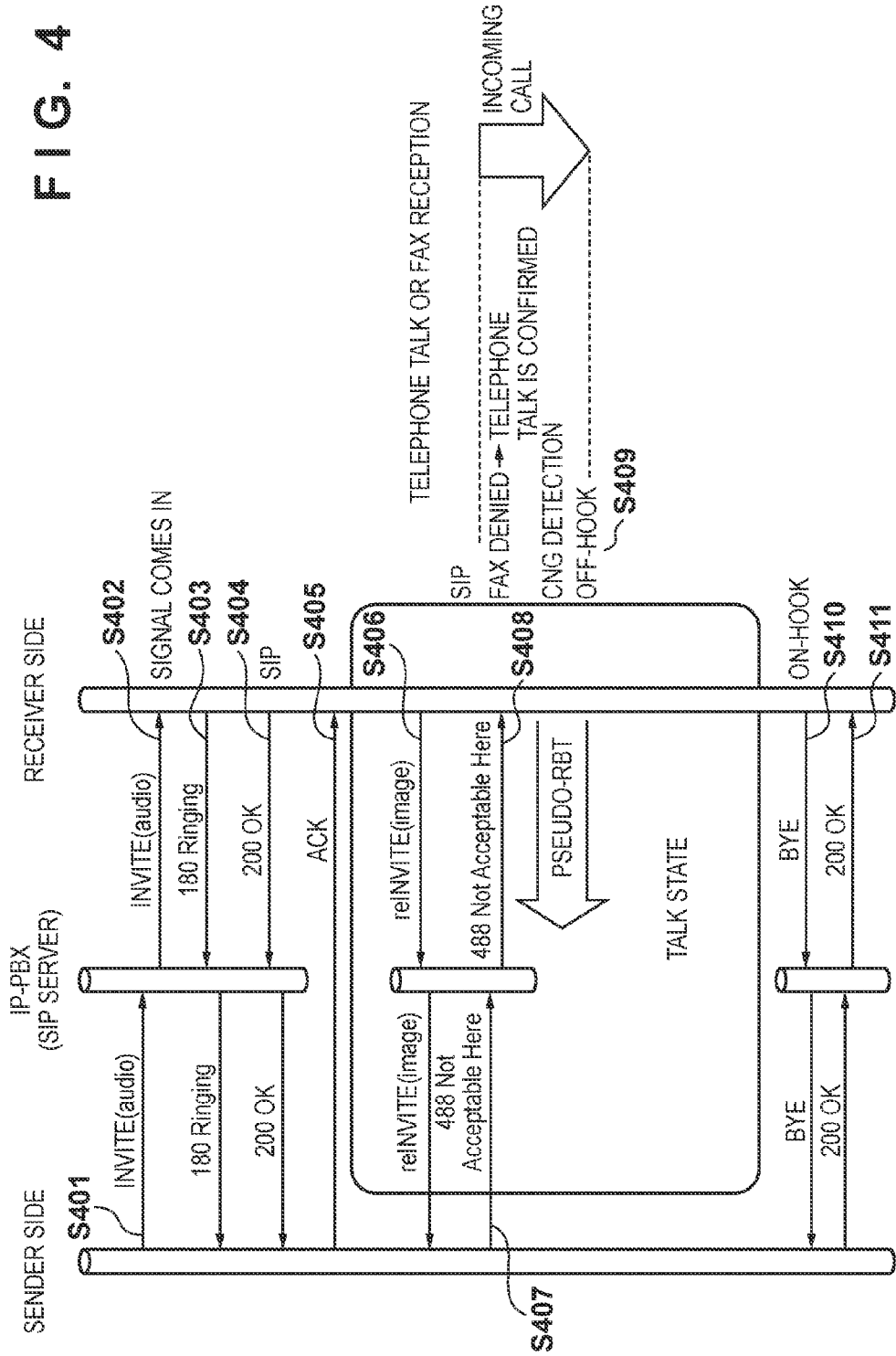
FIG. 4 is a diagram illustrating a sequence in which a receiver executes incoming call processing for telephone talk in the embodiment of the present invention.

FIG. 4 is a diagram illustrating a sequence in which a receiver executes incoming call processing for telephone talk in the embodiment of the present invention.

In step S401, a sender transmits a session establishment request (INVITE signal) for establishing a session of the "audio" media type to the communication partner via an IP-PBX so as to perform telephone talk. Accordingly, in step S402, the receiver receives the session establishment request (INVITE signal) for establishing a session of the "audio" media type. Here, incoming call processing is not immediately executed, but a provisional response (180 Ringing) in step S403 and a success response (200 OK) in step S404 are transmitted. Then, in step S405, the receiver receives an ACK signal from the sender, and an audio session is established.

Next, in step S406, the receiver transmits, to the sender, a session switch request (reINVITE signal) for switching the session to a session of the "image" media type, in order to determine whether the incoming call is for telephone talk or communication using the T.38 protocol (T.38 communication).

In this case, since the sender intends to perform telephone talk, an error response (488 Not Acceptable Here) is made in step S407 in response to the session switch request for T.38 communication that is for switching the session to a session of the "image" media type. Accordingly, in step S408, the receiver receives the error response (488 Not Acceptable Here) from the sender, and determines that the incoming call is not for T.38 communication but for telephone talk. Then, incoming call processing for calling an operator, and processing for emitting a pseudo-ring back tone are executed, the pseudo-ring back tone indicating to the sender that calling is currently being made. Then, when the operator takes the telephone 110 off the hook so as to respond to the calling, the receiver stops, in step S409, executing the incoming call processing and emitting the pseudo-ring back tone, resulting in a talk state. When the telephone talk ends and the receiver puts the telephone 110 on the hook, in step S410, a BYE signal is transmitted to the sender. When a success response (200 OK) is received from the sender, the session ends in step S411.

Figure 5:
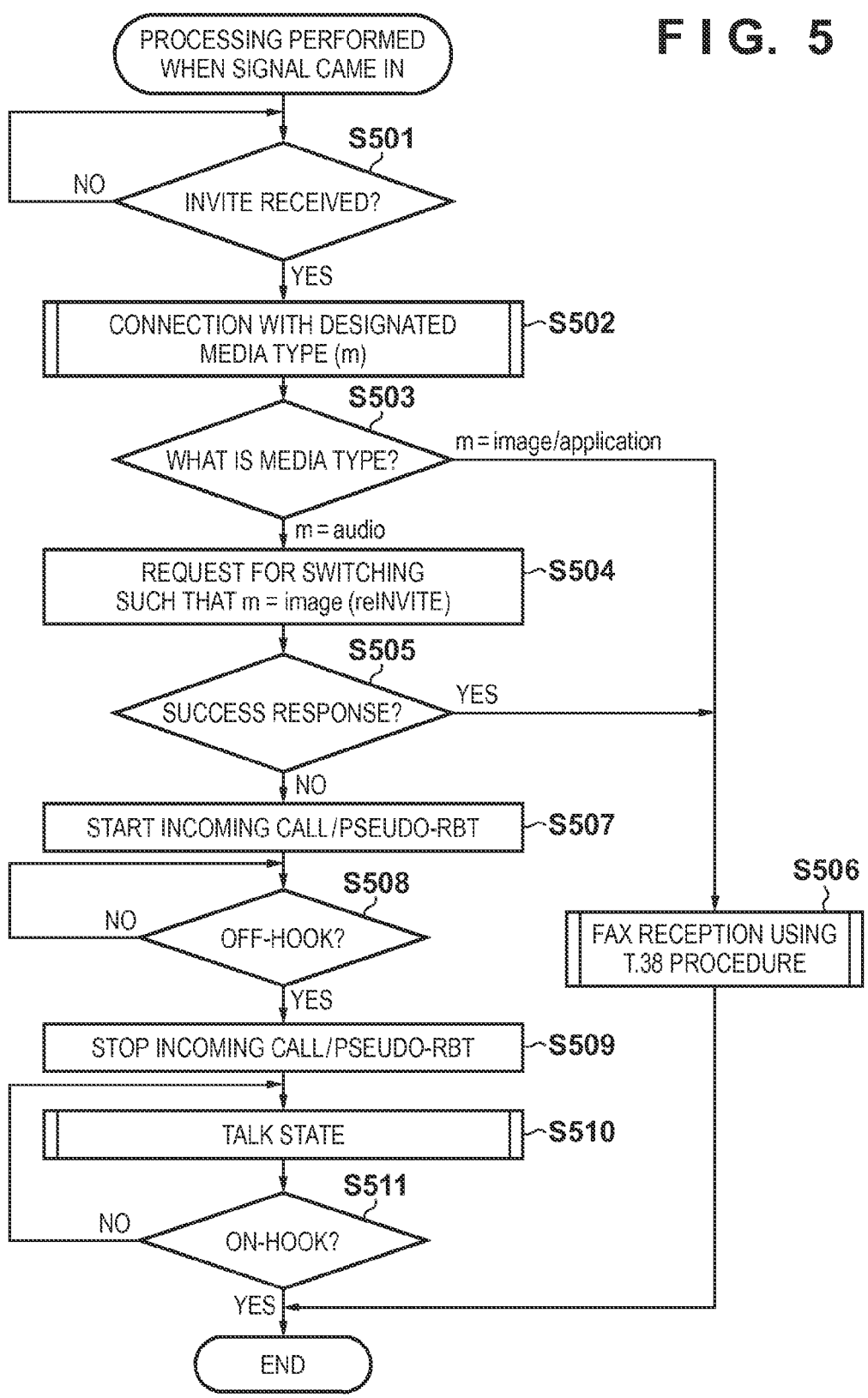

FIG. 5 is a flowchart for describing processing that is performed by the facsimile apparatus according to the present embodiment when a signal came in. Here, incoming call processing is executed when telephone talk is intended, and T.38 communication is executed when T.38 communication is intended. Note that a program for executing this processing is stored in the ROM 102, and by the CPU 101 executing this program, the processing described by this flowchart is executed.

First, when the CPU 101 has received in step S501 a session establishment request (INVITE signal), the processing advances to step S502, and the CPU 101 performs connection in a media session of the media type that was designated by the INVITE signal. Next, the processing advances to step S503, and the CPU 101 determines whether the designated media type is either one of "image" and "application", and if so, the processing advances to step S506, and the CPU 101 executes facsimile reception processing using the T.38 protocol. On the other hand, if it is determined in step S503 that the designated media type is "audio", the processing advances to step S504. In step S504, the CPU 101 transmits a session switch request (reINVITE signal) for switching the session to a session of the media type "image" to the sender, and asks the sender whether the incoming call is for telephone talk or T.38 communication.

Next, the processing advances to step S505, and if a success response (200 OK) to the session switch request in step S504 is received, the processing advances to step S506, and the CPU 101 executes facsimile reception processing using the T.38 protocol. On the other hand, if, in step S505, the sender responds to the session switch request with an error response, it is determined that the incoming call is for telephone talk and the processing advances to step S507. In step S507, the CPU 101 starts the incoming call processing for calling an operator and processing for emitting a pseudo-ring back tone that indicates to the sender that calling is currently being made.

Next, the processing advances to step S508, and if the CPU 101 detects that the operator has taken the telephone 110 off the hook, the processing advances to step S509, and the CPU 101 stops the incoming call processing and the processing for emitting a pseudo-ring back tone. Then, the processing advances to step S510, and shifts to a talk state. Next, in step S511, if the CPU 101 detects that the telephone 110 is in an on-hook state, a BYE signal is transmitted and the session ends.

As described above, the facsimile apparatus that performs call control using SIP, and includes a T.38 communication function for realizing an IP telephone function determines, when having received a session establishment request (INVITE signal) for establishing a session of the "audio" media type, whether telephone talk or T.38 communication is intended. If it is determined that T.38 communication is intended, facsimile reception processing using the T.38 protocol is executed, and if it is determined that telephone talk is intended, incoming call processing for calling an operator is executed, and the apparatus is placed in a talk state.

Figure 6B:
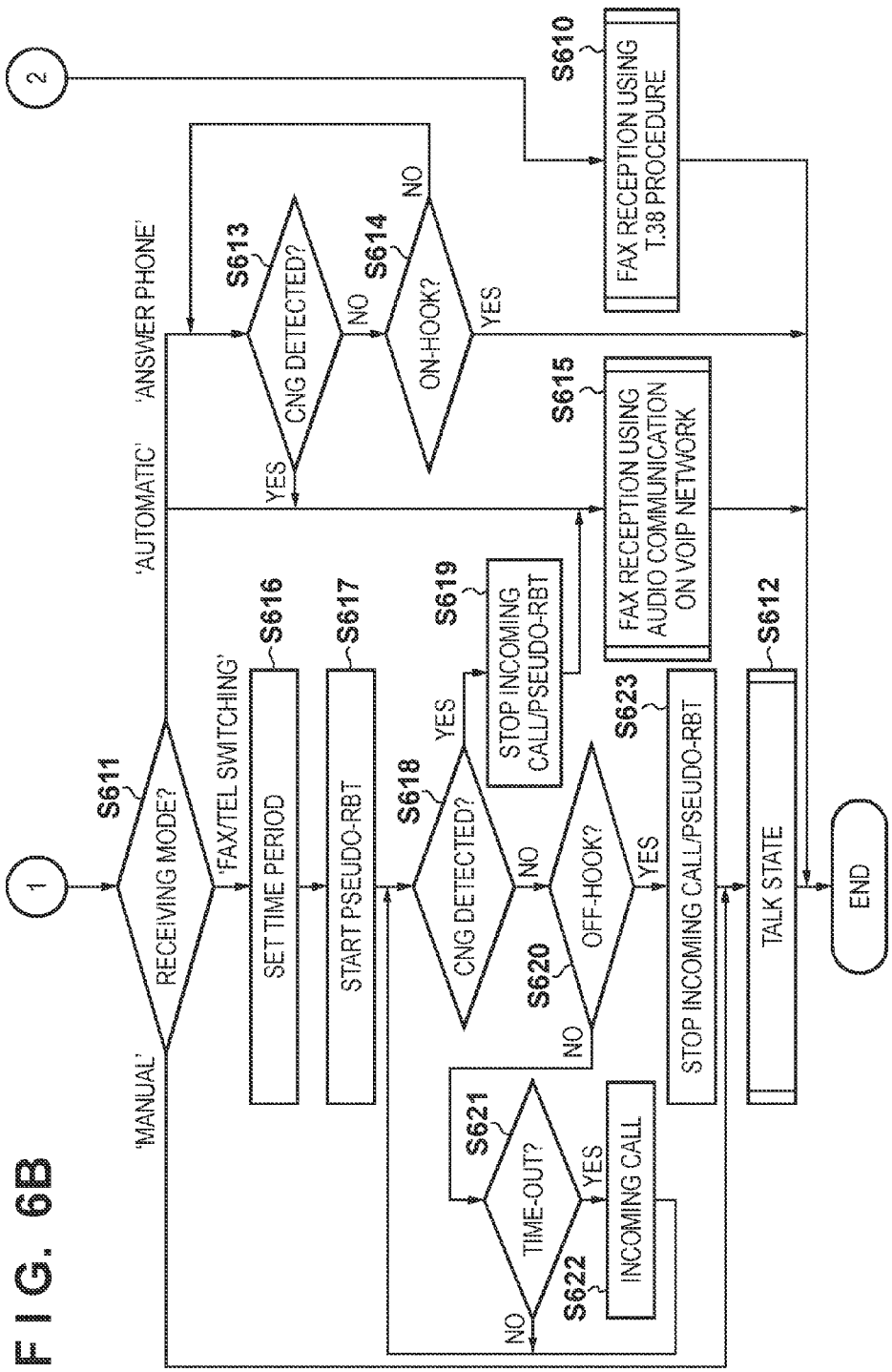

FIGS. 6A and 6B are flowcharts for describing processing performed when the facsimile apparatus according to the embodiment of the present invention receives a session establishment request (INVITE signal). Note that a program for executing this processing is stored in the ROM 102, and by the CPU 101 executing this program, the processing described by the flowcharts is executed.

This processing starts with reception of the session establishment request (INVITE signal), and at first in step S601, the CPU 101 determines what the receiving mode of it's own apparatus is, and if the receiving mode is an automatic receiving mode or a FAX/TEL automatic switching mode, the processing advances to step S606. In step S606, the CPU 101 notifies the sender of a success response (200 OK) without executing the incoming call processing. On the other hand, if it is determined in step S601 that the receiving mode of the apparatus is a manual receiving mode or an answer phone connecting mode, the processing advances to step S602 and the CPU 101 starts the incoming call processing, and further the processing advances to step S603 and the CPU 101 notifies the sender of a provisional response (180 Ringing). Then, in step S604, if the connected telephone responds to the incoming call and it is detected that the telephone is off the hook, the processing advances to step S605 and the CPU 101 stops the incoming call processing, and further the processing advances to step S606 and the sender is notified of a success response (200 OK).

Next, the processing advances to step S607, and if the CPU 101 receives an ACK signal from the sender, a session of the media type "audio" is established. Then, the processing advances to step S608, and the CPU 101 transmits, to the sender, a session switch request (reINVITE signal) for switching the session to a session of the "image" media type, in order to determine whether telephone talk or facsimile communication using the T.38 protocol is intended. Then, the processing advances to step S609, where it is determined what a response to the session switch request (reINVITE signal) for switching the session to a session of the "image" media type is. Here, if it is determined that the response is a success response (200 OK), the processing advances to step S610 (FIG. 6B), and the CPU 101 switches the session to a session of the media type "image" and executes the facsimile reception processing using the T.38 protocol.

On the other hand, if in step S609, an error response is received, it is then determined that not facsimile communication using the T.38 protocol but telephone talk or facsimile communication on VoIP network is intended, and processing advances to step S611 (FIG. 6B). In step S611, the CPU 101 determines what the receiving mode of the own apparatus is, in order to execute appropriate processing for the corresponding receiving mode while maintaining the session of the "audio" media type. Here, if the receiving mode is the manual receiving mode, the processing advances to step S612 and shifts to a talk state.

Also, if it is determined in step S611 that the receiving mode is the answer phone connecting mode, the processing advances to step S613, and the CPU 101 observes a CNG signal that is transmitted from the sender. If in step S613, the CNG signal is detected, the processing advances to step S615, and the CPU 101 executes facsimile reception using an audio communication on the VoIP network. On the other hand, if no CNG signal is detected in step S613 and the telephone 110 connected is in a on-hook state in step S614, the sender is notified of a BYE signal and the session ends.

Alternatively, if it is determined in step S611 that the receiving mode is the automatic receiving mode, the processing advances to step S615, and the CPU 101 executes facsimile reception processing using audio communication on the VoIP network without executing the incoming call processing.

Further alternatively, if it is determined in step S611 that the receiving mode is the FAX/TEL automatic switching mode, the processing advances to step S616, and the CPU 101 sets a predetermined time period for the real time clock 107. Then the processing advances to step S617, and the CPU 101 starts the processing for emitting a pseudo-ring back tone to the sender. Then, the processing advances to step S618, and it is determined whether or not a CNG signal is detected. If no CNG signal is detected, the processing advances to step S620, in which it is determined whether or not an off-hook state of the telephone 110 is detected. If it is determined in step S620 that an off-hook state is not detected, the processing advances to step S621, and the CPU 101 determines whether or not measurement of a predetermined time period by the real time clock 107 is completed, that is, whether or not time-out is detected. If it is determined that time-out is detected, the processing advances to step S622, and the CPU 101 starts the incoming call processing for calling an operator and the processing advances to step S618. In step S618, if a CNG signal is detected, the processing advances to step S619, and the CPU 101 stops the incoming call processing and the processing for emitting a pseudo-ring back tone. Then, the processing advances to step S615, and the CPU 101 executes the facsimile reception processing using audio communication on the VoIP network.

On the other hand, if no CNG signal has been detected in step S618 and the telephone 110 is taken off the hook in step S620 in response to an incoming call, the processing advances to step S623, and the CPU 101 stops the incoming call processing and the processing for emitting a pseudo-ring back tone. Then, the processing shifts to a talk state in step S612.

As described above, the facsimile apparatus according to the present embodiment, which performs call control using the SIP, has an IP telephone function and a function for performing an audio communication on VoIP network, and includes a plurality of receiving modes for facsimile reception, can perform following procedures:

(1) in which an audio session is established if a session establishment request for establishing a session of the media type "audio" is received, and then an image session establishment request for performing T.38 communication is transmitted. Then, if a success response is received, an image session is established and facsimile communication using T.38 procedures is performed (step S610);

(2) in the case of an automatic receiving mode in which audio communication on the VoIP network is automatically performed, the success response is transmitted upon reception of the session establishment request using the SIP, and no incoming call processing is executed even after the audio session was established;

(3) in the case of a manual receiving mode in which reception is executed by an operation of an operator, the incoming call processing is executed upon reception of the session establishment request using the SIP, and the incoming call is stopped when the connected telephone is taken off the hook, and talk processing is executed;

(4) in the case of an answer phone connecting mode in which the operation of a connected answer phone that is currently responding is switched to a receiving operation upon detection of a facsimile signal, the incoming call processing is executed upon reception of the session establishment request using the SIP. Also, a CNG signal is observed after off-hook of the connected answer phone was detected, and if the CNG signal is detected, G3 facsimile reception using an audio communication on VoIP network is performed (step S615); and (5) in the case of the FAX/TEL automatic switching mode in which it is automatically determined whether facsimile communication or telephone talk is intended so as to perform corresponding one of the telephone talk processing and the reception processing, the session establishment request for establishing a session of the media type "audio" is received, the success response is transmitted, and an audio session is established. Then, detection of a CNG signal starts and if no CNG signal could be detected within a preset time period, incoming call processing is executed (step S622), and if a CNG signal has been detected, G3 facsimile reception using audio communication on the VoIP Network is executed (step S615).

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium.

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

This application claims the benefit of Japanese Patent Application No. 2012-245634, filed Nov. 7, 2012, which is hereby incorporated by reference herein in its entirety.

The invention claimed is:

1. A facsimile apparatus for performing communication using a session established according to a session initiation protocol (SIP), comprising:

transmission means for transmitting, in a case that an INVITE in which "audio" is designated as a media type is received, an INVITE in which "image" is designated as a media type;

facsimile communication means for establishing an image session and executing facsimile communication in a case that a success response is made to the INVITE transmitted by the transmission means; and calling means for starting calling processing for calling an operator in a case that an error response is made to the INVITE transmitted by the transmission means.

2. The facsimile apparatus according to claim 1, further comprising:

detection means for detecting that a telephone is in an off-hook state in response to the calling processing; and audio communication means for establishing an audio session and executing audio communication in a case that the detection means detects that the telephone is in an off-hook state.

3. The facsimile apparatus according to claim 1, wherein in a case that an INVITE in which "image" or "application" is designated as a media type is received, the transmission means does not transmit the INVITE.

4. The facsimile apparatus according to claim 1, further comprising:

setting means for setting a receiving mode, wherein in a case where the receiving mode set by the setting means is a first receiving mode, the calling means starts the calling processing in a case that an error response is made to the INVITE transmitted by the transmission means, and in a case where the receiving mode set by the setting means is a second receiving mode, the calling means starts the calling processing before the transmission means transmits the INVITE.

5. A communication apparatus for performing communication using a session established according to a session initiation protocol (SIP), comprising:

transmission means for transmitting, in a case that an INVITE in which "audio" is designated is received, an INVITE in which "image" is designated;

image communication means for executing image communication in a case that a success response is made to the INVITE transmitted by the transmission means; and calling means for starting calling processing for calling an operator in a case that an error response is made to the INVITE transmitted by the transmission means.

6. The communication apparatus according to claim 5, further comprising:

detection means for detecting that a telephone is in an off-hook state in response to the calling processing; and audio communication means for establishing an audio session and executing audio communication in a case that the detection means detects that the telephone is in an off-hook state.

7. The communication apparatus according to claim 5, wherein in a case that an INVITE in which "image" or "application" is designated is received, the transmission means does not transmit the INVITE.

8. The communication apparatus according to claim 5, further comprising:
setting means for setting a receiving mode,
wherein in a case where the receiving mode set by the setting means is a first receiving mode, the calling means starts the calling processing in a case that an error response is made to the INVITE transmitted by the transmission means, and in a case where the receiving mode set by the setting means is a second receiving mode, the calling means starts the calling processing before the transmission means transmits the INVITE.

9. A communication apparatus for performing communication using a session established according to a session initiation protocol (SIP), comprising:
transmission means for transmitting, in a case that an INVITE is received, an INVITE for changing a media type; and
calling means for starting calling processing for calling an operator in a case that an error response is made to the INVITE transmitted by the transmission means.

10. The communication apparatus according to claim 9, further comprising:
facsimile communication means for executing facsimile communication in a case that a success response is made to the INVITE transmitted by the transmission means.

11. The communication apparatus according to claim 9, further comprising:
detection means for detecting that a telephone is in an off-hook state in response to the calling processing, and
audio communication means for executing audio communication in a case that the detection means detects that the telephone is in an off-hook state.

12. The communication apparatus according to claim 9, wherein in a case that an INVITE in which "image" or "application" is designated as a media type is received, the transmission means does not transmit the INVITE.

13. The communication apparatus according to claim 9, further comprising:
setting means for setting a receiving mode,
wherein in a case where the receiving mode set by the setting means is a first receiving mode, the calling means starts the calling processing in a case that an error response is made to the INVITE transmitted by the transmission means, and in a case where the receiving mode set by the setting means is a second receiving mode, the calling means starts the calling processing before the transmission means transmits the INVITE.

14. A method for controlling a facsimile apparatus for performing communication using a session established according to a session initiation protocol (SIP), comprising:
a transmission step of transmitting, in a case that an INVITE in which "audio" is designated as a media type is received, an INVITE in which "image" is designated as a media type;
a facsimile communication step of establishing an image session and executing facsimile communication in a case that a success response is made to the INVITE transmitted in the transmission step, and
a calling step of starting calling processing for calling an operator in a case that an error response is made to the INVITE transmitted in the transmission step.

15. A non-transitory computer readable storage medium storing a program for causing a computer to execute the method defined by claim 14.

16. A communication method for performing communication using a session established according to a session initiation protocol (SIP), comprising:
a transmission step of transmitting, in a case that an INVITE in which "audio" is designated is received, an INVITE in which "image" is designated;
an image communication step of executing image communication in a case that a success response is made to the INVITE transmitted in the transmission step; and
a calling step of starting calling processing for calling an operator in a case that an error response is made to the INVITE transmitted in the transmission step.

17. A non-transitory computer readable storage medium storing a program for causing a computer to execute the communication method defined by claim 16.

18. A communication method for performing communication using a session established according to a session initiation protocol (SIP), comprising:
a transmission step of transmitting, in a case that an INVITE is received, an INVITE for changing a media type; and
a calling step of starting calling processing for calling an operator in a case that an error response is made to the INVITE transmitted in the transmission step.

19. A non-transitory computer readable storage medium storing a program for causing a computer to execute the communication method defined by claim 18.

* * * * *